(12) United States Patent
Xiao et al.

(10) Patent No.: US 11,290,946 B2
(45) Date of Patent: Mar. 29, 2022

(54) BASE STATION, USER EQUIPMENT AND RELATED METHOD

(71) Applicants: SHARP KABUSHIKI KAISHA, Sakai (JP); FG Innovation Company Limited, Tuen Mun (HK)

(72) Inventors: Fangying Xiao, Shanghai (CN); Shohei Yamada, Sakai (JP); Renmao Liu, Shanghai (CN)

(73) Assignees: FG Innovation Company Limited, Hong Kong (HK); Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 16/343,721

(22) PCT Filed: Nov. 2, 2017

(86) PCT No.: PCT/CN2017/109089
§ 371 (c)(1),
(2) Date: Apr. 19, 2019

(87) PCT Pub. No.: WO2018/082605
PCT Pub. Date: May 11, 2018

(65) Prior Publication Data
US 2019/0274093 A1    Sep. 5, 2019

(30) Foreign Application Priority Data

Nov. 4, 2016  (CN) .......................... 201610974620.4

(51) Int. Cl.
*H04W 48/14* (2009.01)
*H04W 76/27* (2018.01)
(Continued)

(52) U.S. Cl.
CPC .............. *H04W 48/14* (2013.01); *H04L 5/00* (2013.01); *H04L 27/26* (2013.01); *H04L 29/06* (2013.01);
(Continued)

(58) Field of Classification Search
CPC ..... H04W 48/14; H04W 76/27; H04W 48/10; H04W 56/0045; H04W 72/1221;
(Continued)

(56) References Cited

U.S. PATENT DOCUMENTS

| 2008/0039083 A1* | 2/2008 | Muniere | ................ H04W 48/16 |
| | | | 455/434 |
| 2008/0194282 A1* | 8/2008 | Nibe | ..................... H04W 52/16 |
| | | | 455/522 |

(Continued)

FOREIGN PATENT DOCUMENTS

| CN | 101442724 A | * | 5/2009 |
| CN | 101442742 A | | 5/2009 |

(Continued)

OTHER PUBLICATIONS

Samsung, "Report of email discussion on [94#40][NR] System information", R2-165201, 3GPP TSG-RAN WG2 95, Gothenburg, Sweden, Aug. 22-26, 2016 (Year: 2016).*

(Continued)

*Primary Examiner* — Hardikkumar D Patel
(74) *Attorney, Agent, or Firm* — Imperium Patent Works

(57) ABSTRACT

The present disclosure provides a method for obtaining supplementary system information, and a corresponding user equipment (UE), and base station. A method used in the UE according to the present invention comprises: sending a system information request message to a base station to request required supplementary system information, and starting a timer simultaneously; and receiving the requested supplementary system information within a time window defined by the timer.

20 Claims, 8 Drawing Sheets

(51) Int. Cl.
*H04W 48/10* (2009.01)
*H04W 56/00* (2009.01)
*H04W 72/12* (2009.01)
*H04L 27/26* (2006.01)
*H04L 5/00* (2006.01)
*H04L 9/40* (2022.01)

(52) U.S. Cl.
CPC ....... *H04W 48/10* (2013.01); *H04W 56/0045* (2013.01); *H04W 72/1221* (2013.01); *H04W 76/27* (2018.02)

(58) Field of Classification Search
CPC ... H04W 74/0833; H04W 4/06; H04W 48/12; H04W 72/0413; H04W 72/14; H04W 74/006; H04W 48/08; H04W 74/002; H04L 5/00; H04L 27/26; H04L 29/06; H04L 5/0007; H04L 5/0048; H04L 5/0053; H04L 27/2692
See application file for complete search history.

(56) References Cited

U.S. PATENT DOCUMENTS

| | | | | |
|---|---|---|---|---|
| 2010/0128805 | A1* | 5/2010 | Tanno | H04B 1/7083 |
| | | | | 375/260 |
| 2014/0315549 | A1* | 10/2014 | Zhang | H04W 48/08 |
| | | | | 455/434 |
| 2017/0019930 | A1* | 1/2017 | Lee | H04W 72/0413 |
| 2017/0251500 | A1* | 8/2017 | Agiwal | H04W 74/0833 |
| 2018/0227832 | A1* | 8/2018 | Da Silva | H04J 11/0069 |
| 2019/0174438 | A1* | 6/2019 | Zhang | H04W 72/0446 |

FOREIGN PATENT DOCUMENTS

| | | |
|---|---|---|
| CN | 101742572 A | 6/2010 |
| CN | 102845016 A | 3/2011 |
| CN | 103517211 A | 1/2014 |
| CN | 104219767 A | 12/2014 |
| EP | 0967740 A1 | 6/1998 |

OTHER PUBLICATIONS

Samsung, "Report of email discussion on [94#40][NR] System information", R2-165201, 3GPP TSG-RAN WG2 95, Gothenburg, Sweden, Aug. 22-26, 2016.

NTT Docomo, "New SID Proposal: Study on New Radio Access Technology", RP-160671, 3GPP TSG RAN Meeting #71, Göteborg, Sweden, Mar. 7-10, 2016.

Samsung: Email Discussion on System Information, Agenda Item 9.4.3.2; 3GPP Draft R2-165201, 3GPP TSG-RAN WG2 95, 3rd Gen. Partnership Project (3GPP), Gothenburg, Sweden, Aug. 22-26, 2016 (31 pages).

Office action of the Chinese Patent Office in foreign related application CN201610974620.4 dated Dec. 29, 2020 (7 pages).

* cited by examiner

BASE STATION, USER EQUIPMENT AND RELATED METHOD

TECHNICAL FIELD

The present disclosure relates to the technical field of wireless communications. More specifically, the present disclosure relates to a method for acquiring system information, a corresponding base station, and corresponding user equipment.

BACKGROUND

A new research project on 5G technical standards (see non-patent literature: RP-160671: New SID Proposal: Study on New Radio Access Technology) was proposed by NTT DOCOMO at the 3rd Generation Partnership Project (3GPP) RAN #71 plenary meeting held in March 2016, and was approved. The goal of the research project is to develop a New Radio (NR) access technology to meet all of the application scenarios, requirements, and deployment environments of 5G. NR mainly has three application scenarios: Enhanced Mobile Broadband Communications (Enhanced Mobile Broadband: eMBB), massive Machine Type Communication (mMTC), and Ultra Reliable and Low Latency Communications (URLLC). According to the planning of the research project, the standardization of NR is conducted in two stages: the first-stage standardization will be completed by the middle of 2018; the second-stage standardization will be completed by the end of 2019. The first-stage standard specifications need to be forward-compatible with the second-stage standard specifications, while the second-stage standard specifications need to be established on the basis of the first-stage standard specifications and to meet all requirements of 5G NR technical standards.

For better energy conservation and emission reduction, the initial requirement of the project is to avoid repeated sending of unnecessary information by the network side. This requirement is based on the following consideration:

In an existing LTE system, in order to ensure normal access of LTE user equipment (UE), a base station (which may be denoted as eNB or gNB) periodically broadcasts access stratum and non-access stratum information, which is collectively referred to as system information. In the present UTE system, the system information is divided into a Master Information Block (MIB) and multiple System Information Blocks (SIBs) for carrying different content; and up to 20 types of SIBs are defined by LTE so far. The MIB carries the necessary and most frequently transmitted parameters for acquiring basic information of a cell. SIB1 includes parameters for determining whether a cell is suitable for cell selection and time domain scheduling information of other SIBs. The MIB and the SIB1 are sent in a predefined time period. Other SIBs with the same scheduling period are arranged in the same System Information Message (referred to as an SI message) and are periodically sent in a corresponding system information window (SI-window) according to time domain scheduling information carried in the SIB1. Other than MIB and SIB1, not all SIBs need to be broadcast. According to the features supported by a current access network device and the features of the non-access stratum, the eNB selects a system information block relevant to the features for broadcast. For example, if the current access network supports enhanced access control, the eNB broadcasts SIB14, which carries relevant information of EAB; otherwise, broadcasting is not performed. If the current access network supports a multimedia broadcast multicast service (MBMS), the eNB broadcasts SIB13 and so on. These broadcast SIBs are reflected in the scheduling information carried by the SIB1; and unscheduled SIBs are not broadcast. Prior to initiating the access, the VP further needs to acquire other SIBs based on its own features in addition to the MIB and SIB1 that must he acquired; and then the access is initiated. For example, if the UE supports multiple RATS, SIB8 further needs to be read to acquire inter-RAT-related cell reselection information; otherwise, SIB8 does not need to be read. If the UE supports WLAN interoperation, SIB17 further needs to be acquired; otherwise, SIB17 does not need to be acquired.

The method of periodic broadcasting of all system information supported by the eNB helps the UE to acquire the corresponding information at any time. However, this method does not consider the acquisition needs of the UE (for example, only a small number of UEs need to acquire some of the system information); and all system information supported by the eNB is broadcast repeatedly on a specific downlink resource, resulting in low system resource utilization and large energy consumption. At the 3GPP RAN2#94 meeting, some manufacturers proposed to transmit system information by combining network autonomous broadcasting and UE request transmission. These manufacturers suggested to classify system information into two categories: one type of system information is sent by the eNB autonomously through periodic broadcasting (this type of system information is referred to as minimum system information or first system information in the present disclosure), where this type of system information may include parameters required for cell access and/or cell selection-related parameters and/or parameters necessary for acquiring other system information or system information required by most UE; and the other type of system information is system information not included in the first system information and is sent in certain cases (for example, when a UP request is received or when an update is required) (this type of system information is referred to as other system information or second system information or supplementary system information in the present disclosure), where the supplementary system information may be sent through broadcast, multicast, or unicast. When the UE needs some or all of the supplementary system information, how to acquire the supplementary system information is a problem that needs to be solved.

SUMMARY OF INVENTION

According to the present disclosure, a method capable of acquiring supplementary system information, corresponding user equipment (UE), and a corresponding base station are provided.

According to a first aspect of the present disclosure, a method used in UE is provided, comprising: sending a system information request message to a base station to request required supplementary system information, and meanwhile starting a timer; and receiving the requested supplementary system information within a time window defined by the timer.

In one embodiment, a value of the time window is set to a multiple of a system information change period.

In one embodiment, a start position of the time window is set to a start subframe of a next system information change period subsequent to the sending of the system information request message.

In one embodiment, a start position of the time window is set to a last subframe of the system information request message plus an offset, and a value of the offset is predefined or configured through radio resource control (RRC) signaling.

In one embodiment, a value of the time window is set to a multiple of a sending period of minimum system information for scheduling the requested supplementary system information.

In one embodiment, a start position of the time window is set to a start subframe of a next sending period subsequent to the sending of the system information request message.

In one embodiment, a start position of the time window is set to a last subframe of the system information request message plus an offset, and a value of the offset is predefined or configured through RRC signaling.

According to a second aspect of the present disclosure, UE is provided, comprising: a sending unit, configured to send a system information request message to a base station to request required supplementary system information; a timer unit, configured to start a timer at the moment when the sending unit sends the system information request message to the base station; and a receiving unit, configured to receive the requested supplementary system information within a time window defined by the timer.

In one embodiment, a value of the time window is set to a multiple of a system information change period.

In one embodiment, a start position of the time window is set to a start subframe of a next system information change period subsequent to the sending of the system information request message.

In one embodiment, a start position of the time window is set to a last subframe of the system information request message plus an offset, and a value of the offset is predefined or configured through RRC signaling.

In one embodiment, a value of the time window is set to a multiple of a sending period of minimum system information for scheduling the requested supplementary system information.

In one embodiment, a start position of the time window is set to a start subframe of a next sending period subsequent to the sending of the system information request message.

In one embodiment, a start position of the time window is set to a last subframe of the system information request message plus an offset, and a value of the offset is predefined or configured through RRC signaling.

According to a third aspect of the present disclosure, a method used in a base station is provided, comprising: receiving a system information request message from UE, the system information request message requesting supplementary system information required by the UE; and sending the requested supplementary system information to the UE in response to the receiving of the system information request message.

According to a fourth aspect of the present disclosure, a base station is provided, comprising: a receiving unit, configured to receive a system information request message from UE, the system information request message requesting supplementary system information required by the UE; and a sending unit, configured to send the requested supplementary system information to the UE in response to the receiving of the system information request message.

BRIEF DESCRIPTION OF DRAWINGS

The above and other features of the present disclosure will become more apparent with the following detailed description in conjunction with the accompanying drawings.

DETAILED DESCRIPTION OF EMBODIMENTS

The following describes the present disclosure in detail with reference to the accompanying drawings and specific embodiments. It should be noted that the present disclosure should not be limited to the specific embodiments described below. In addition, for simplicity, detailed description of the known art not directly related to the present disclosure is omitted to prevent confusion in understanding the present disclosure.

The terms involved in the present disclosure are described below:

PDCCH: Physical Downlink Control Channel;
CCCH: Common Control Channel;
DCCH: Dedicated Control Channel;
BCCH: Broadcast Control Channel;
RRC: Radio Resource Control
RRC inactive state: the state is a state different from an RRC idle state and an RRC connected state, where UE in this state is based on a notification process initiated by a radio access network (RAN).
MAC CE: media access control control element
System information block: parameters applicable to all UE or some UE are grouped in a predefined manner (for example, grouped by function or grouped depending on whether the parameters are applicable to all UE), and each group of parameters is referred to as a system information block denoted as SIB. For example, neighboring cell-related parameters for cell reselection are used as a system information block.

System information block group: a collection of multiple system information blocks is referred to as a system information block group denoted as SI.

System information change period: a system information change period may be used to define that a change in system information can occur only in a specific system frame; that is, according to scheduling of the system information, the system information may be sent many times in the system information change period with the content remaining unchanged.

If not specifically indicated, the system information in the present disclosure may be a system information block or a system information block group.

A method for acquiring supplementary system information according to the present disclosure is described below with reference to the accompanying drawings.

Implementation Scheme 1
Preamble Sequence/Response Message

Figure 1:
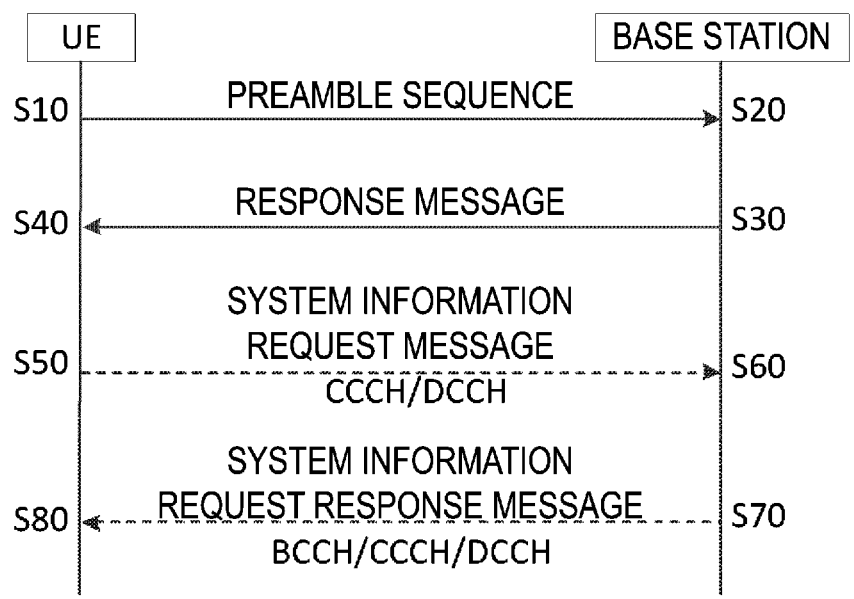
FIG. 1 is a flowchart of a method for acquiring supplementary system information according to Implementation Scheme 1 of the present disclosure.

FIG. 1 is a flowchart of a method for acquiring supplementary system information according to Implementation Scheme 1 of the present invention.

Step S10: UE sends a preamble sequence to a base station to request supplementary system information.

Step S20: the base station receives the preamble sequence sent by the UE.

Step S30: the base station sends a response message to the UE.

Step S40: the UE receives the response message sent by the base station.

The preamble sequence may be a preamble sequence predefined or configured through RRC signaling for requesting supplementary system information.

In one embodiment, one preamble sequence or one group of preamble sequences is predefined or configured through RRC signaling for requesting supplementary system information. When the UE needs to request supplementary system information, the preamble sequence is sent, or a preamble sequence is selected (for example, random selection with equal probability) from the preamble sequence group for sending. The preamble sequence or preamble sequence group is referred to as a first preamble sequence in the present disclosure.

In one embodiment, two preamble sequences or two groups of preamble sequences are predefined or configured through RRC signaling for requesting supplementary system information. One preamble sequence or one group of preamble sequences is used for requesting all supplementary system information. That is, when the UE needs to request all supplementary system information, the preamble sequence is sent, or a preamble sequence is selected (for example, random selection with equal probability) from the corresponding preamble sequence group for sending. The preamble sequence or preamble sequence group is referred to as a second preamble sequence in the present disclosure. The other preamble sequence or preamble sequence group is used for requesting some supplementary system information. That is, When the UE needs to request some supplementary system information, the preamble sequence is sent, or a preamble sequence is selected (for example, random selection with equal probability) from the corresponding preamble sequence group for sending. The preamble sequence or preamble sequence group is referred to as a third preamble sequence in the present disclosure.

In one embodiment, the preamble sequence includes multiple preamble sequences corresponding to different system information blocks/system information block groups respectively, and the sending the preamble sequence to the base station includes: selecting a preamble sequence corresponding to a system information block/system information block group required by the UE from the multiple preamble sequences for sending. The correspondence between the multiple preamble sequences and system information blocks/system information block groups is predefined or configured through RRC signaling. The correspondence may be that one preamble sequence corresponds to one system information block; for example, a system information block SIB X corresponds to a preamble sequence Y. The correspondence may also be that one preamble sequence corresponds to one system information block group; for example, a system information block group N corresponds to a preamble sequence S, where the system information block group N includes system information blocks SIB X1, SIB X2, and SIB X3. One preamble sequence may also be predefined or configured through RRC signaling to correspond to all supplementary system information. That is, one of the multiple preamble sequences corresponds to all system information. In this embodiment, when the UE needs to request a system information block or system information block group or all supplementary system information, a corresponding preamble sequence is selected and sent. All the supplementary system information in the present disclosure may be all supplementary system information supported by a cell.

In one embodiment, one or more (or one or more groups of) preamble sequences are predefined or configured through RRC signaling, and the UE selects, according to the number of system information blocks or system information block groups to be requested, a corresponding number of preamble sequences and sends the selected preamble sequences (or selects a preamble sequence from a corresponding preamble sequence group for sending).

It should be noted that a resource used for sending the preamble sequence by the UE may be a resource for performing random access by the UE or a resource predefined or configured through RRC signaling for sending a preamble sequence for requesting supplementary system information. If the resource for sending the preamble sequence for requesting supplementary system information is different from the resource for random access, the base station can determine, according to the resource position of receiving a preamble sequence, whether the UE performs random access or requests supplementary system information; in this case, it is not necessary to predefine or configure a dedicated preamble sequence for requesting supplementary system information. Different resources may be configured for requesting different supplementary system information (namely, system information blocks/system information block groups). For example, different supplementary system information is mapped to different time-frequency resources. When the UE needs specific supplementary system information, a request (or preamble sequence) is sent on a. corresponding time-frequency resource. Accordingly, when the base station receives the request (or preamble sequence), the supplementary system information required by the UE is determined according to a mapping relationship.

Response messages sent by the base station to the UE may also be different for different preamble sequences sent by the UE.

In one embodiment, the base station sends a response message corresponding to the first preamble sequence (or third preamble sequence) to the UE, where the response message includes an allocated uplink resource (UL Grant) that can be used for sending a system information request message by the UE to request the required supplementary system information.

In another embodiment, the base station receives a non-first preamble sequence or non-third preamble sequence (for example, the second preamble sequence) from the UE and sends a response message corresponding to the non-first preamble sequence or non-third preamble sequence (for example, the second preamble sequence) to the UE. Preferably, the base station includes, in the response message, a system information block/system information block group corresponding to the received preamble sequence. Accordingly, the response message received by the UE from the base station includes requested supplementary system information. Alternatively, the response message indicates that the supplementary system information requested by the UE will be broadcast. In this case, the base station will subsequently broadcast the requested supplementary system information, and the UE performs the process of receiving the broadcast supplementary system information. Alternatively, the response message indicates scheduling information of the supplementary system information requested by the UE. In this case, the base station will subsequently send the requested supplementary system information according to the scheduling information, and the UE performs the process of receiving the supplementary system information. For example, the UE receives the requested supplementary system information according to the scheduling information.

In another embodiment, the response message indicates scheduling information of the supplementary system information requested by the UE, where the scheduling information is pre-configured through RRC signaling. In this case, the UE receives the requested system information block/system information block group according to the pre-configured scheduling information.

System Information Request Message/System Information Request Response Message

FIG. 1 further illustrates the following: Step S50: the UE sends a system information request message to the base station on an allocated uplink resource to request the required supplementary system information. Step S60: the base station receives, on the uplink resource allocated to the UE, the system information request message sent by the UE. Step S70: the base station sends a system information request response message to the UE in response to the receiving of the system information request message. Step S80: the UE receives the system information request response message.

The system information request message indicates the supplementary system information to be requested. Preferably, the request message indicates an identifier of one or more system information blocks to be requested. Alternatively, the request message indicates an identifier of one or more system information block groups to be requested. Alternatively, the request message indicates that all supplementary system information is requested. Alternatively, the request message indicates an identifier of one or more system information blocks to he requested and/or an identifier of one or more system information block groups to be requested. The identifiers of the system information blocks or system information block groups may be predefined or configured through RRC signaling.

For example, each system information block has a number, assuming SIB x, which can be used as an identifier of the system information block. Similarly, a system information block group may be explicitly assigned a number, assuming SIB Y, which can be used as an identifier of the system information block. The system information block group may also be indicated implicitly. For example, assuming that first system information includes division information of system information block groups (namely, SIBs included in each SI), the UE may use the order in which the SIs appear as identifiers thereof. The order of appearance may be the order of appearance only in supplementary system information block groups, or may be the order of appearance in all system information block groups.

Optionally, before sending the system information request message, the UE first determines whether a cell (which may be a serving cell or a resident cell) has the requested supplementary system information and whether the requested supplementary system information is broadcast. For example, the UE performs determination by acquiring the first system information.

It should be noted that a radio resource for sending the system information request message by the UE is not limited to an uplink resource obtained through a preamble sequence request/response process (namely, the uplink resource obtained through steps S10 to S40), and may also be an uplink resource obtained in other manners, including, but not limited to, by predefinition, configuration through RRC signaling, and allocation through a PDCCH; in this case, steps S10 to S40 may not be performed.

In one embodiment, the system information request message is an RRC message transmitted on an uplink CCCH logical channel. The system information request message may include an information element (for example, denoted as allOtherSIRequest) for requesting all supplementary system information; the message may also include a supplementary system information block list (for example, denoted as otherSIBRequestList), one element in the list indicating one system information block identifier or an identifier having a one-to-one correspondence with a system information block identifier, for example, a binary string corresponding to a system information block (for example, SIB X1 corresponds to 000); the message may also include a supplementary system information block group list (for example, denoted as otherSIRequestList), one element in the list indicating one system information block group identifier. It should be noted that information elements for requesting all or some supplementary system information may be the same information element, and the request for all or some supplementary system information is realized through different values of the information elements.

In another embodiment, for the UE in an RRC connected state, the system information request message may be an RRC message transmitted on an uplink DCCH logical channel. The system information request message may include an information element (for example, denoted as allOtherSIRequest) for requesting all supplementary system information; the message may also include a supplementary system information block list (for example, denoted as otherSIBRequestList), one element in the list indicating one system information block identifier or an identifier having a one-to-one correspondence with a system information block identifier, for example, a binary string corresponding to a system information block (for example, SIB X1 corresponds to 000); the message may also include a supplementary system information block group list (for example, denoted as otherSIRequestList), one element in the list indicating one system information block group identifier. It should be noted that information elements for requesting all or some supplementary system information may be the same information element, and the request for all or some supplementary system information is realized through different values of the information elements.

Figure 2:
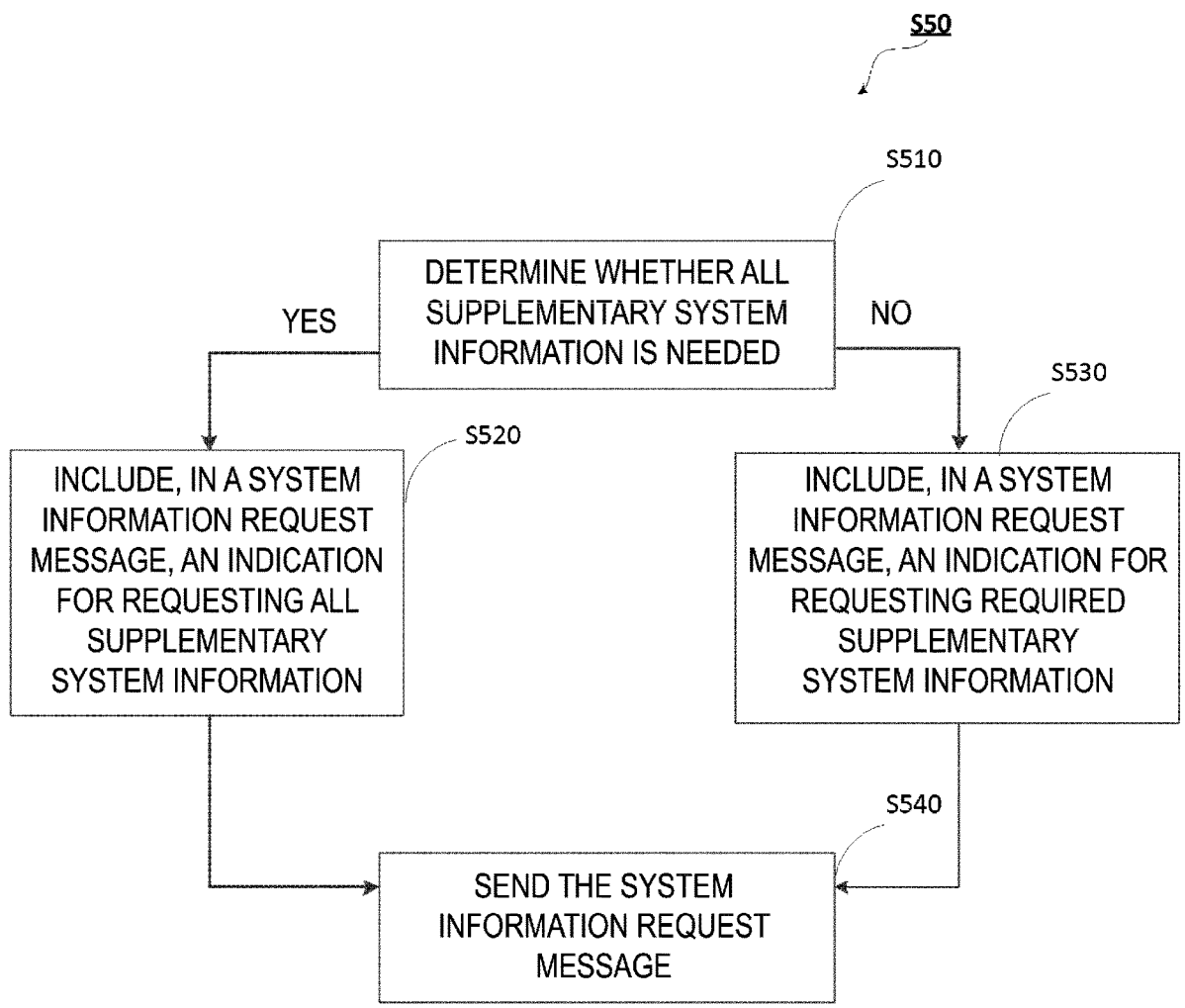
FIG. 2 illustrates an example of a step of sending a system information request message according to the present disclosure.

FIG. 2 illustrates an example of step S50 according to the present disclosure. As shown in the figure, step S50 may further include the following:

Step S510: the UP determines whether all supplementary system information needs to be requested, and if so, perform step S520; if not, that is, the UP needs to request only some supplementary system information, perform step S530.

It should be noted that if the operation that the UE sends a request for all supplementary system information is not supported, step S510 and step S520 are not performed.

Step S520: include, in the system information request message, an indication for requesting all supplementary system information (that is, the message indicates that all supplementary system information is requested). For example, a value of the information element (allOtherSIRequest) corresponding to the request for all supplementary system information is set to "1" or "setup" or "true" or other predefined values.

Step S530: include, in the system information request message, an indication for requesting a required system information block and/or system information block group (namely, the message indicates supplementary system information to be requested). For example, a value of the information element corresponding to some supplementary system information that is requested is set to an identifier of a corresponding system information block or an identifier of a corresponding system information block group.

Optionally, the system information request message further includes a UE identifier. Specifically, if an upper layer provides a UE identifier (for example, an S-TMSI) or an identifier for acquiring a UE context in the base station or other identifiers for distinguishing the UE, the UE identifier is set to the identifier received from the upper layer; if the upper layer does not provide a UE identifier, a random number may be generated, and the UE identifier is set to the generated random number.

Optionally, a time stamp may be carried in the system information request message. For example, the time stamp is a current system time, Step S540: submit the system information request message to a lower layer for transmission.

Optionally, a first timer is started. A value of the first timer is predefined or configured through RRC signaling.

It should be noted that if the UE is in an idle state and if the request message includes a UE identifier, the UE identifier to be sent may be encrypted, for example, encrypted using an asymmetric key. That is, the UE is encrypted using a public key of the base station. At this time, upon receiving the request message, the base station first performs decryption to obtain the UE identifier so as to determine whether the UE is valid. The base station (for example, the eNB) may communicate with a core network to send the UE identifier to the core network, and the core network determines whether the UE is valid and returns a determination result to the base station. The core network may also notify a base station within an area (for example, notify all base stations in a tracking area of the UE) of the UE identifier so that the base station can use the UE identifier to determine whether the UE sending the system information request message is valid UE. In this case, the core network will also notify a corresponding base station of the corresponding UE identifier when the tracking area of the UE is updated. If the UE is in an RRC inactive state or RRC connected state, since the base station and the UE already have corresponding security configurations in this case, the system information request message may be encrypted using the security configuration information, but the UE identifier may not be encrypted. If the request message carries a time stamp, the time stamp may be encrypted.

Figure 3:
FIG. 3 is a schematic diagram of a MAC CE as a system information request message according to the present disclosure.

In another embodiment, the system information request message is one or more MAC CEs. FIG. 3 gives an example of a MAC CE. E is an extended bit for indicating whether another MAC header is also included; R is a reserved bit and may be set to 0; a system information index (SI index) is used for indicating the requested supplementary system information. It should be noted that E and R may or may not exist, multiple R bits may also exist, and the number of bits occupied by the SI index is determined according to the number of system information blocks or system information block groups. One system information block or one system information block group may correspond to one SI index, or it may be defined that one SI index is used for requesting all supplementary system information. A mapping relationship between SI indexes and system information may be predefined or configured through RRC signaling or indicated implicitly. For example, the order in which the system information appears in the first system information has a one-to-one correspondence with the SI indexes (in ascending order or in descending order).

In one embodiment, the system information request response message is an RRC message transmitted on a downlink CCCH logical channel.

In another embodiment, the system information request response message is an RRC message transmitted on a downlink DCCH logical channel.

In another embodiment, the system information request response message is an RRC message transmitted on a downlink BCCH logical channel.

In one embodiment, in step S80, the UE receives a system information request response message, the system information request response message indicating that the base station will broadcast the requested supplementary system information. Then, the base station broadcasts the requested supplementary system information, and the UE receives the broadcast supplementary system information.

In one embodiment, in step S80, the UE receives a system information request response message, the system information request response message indicating scheduling information of the requested supplementary system information. The base station sends the requested supplementary system information according to the scheduling information. Accordingly, the UE receives the requested system information according to the scheduling information.

In one embodiment, the system information request response message is a rejection message.

In one embodiment, the system information request response message includes the supplementary system information requested by the UE (for example, the supplementary system information requested by the UE is included in an information element rrc-SImessage, and the UE determines whether the received system information request response message includes the field). In this case, the UE performs configuration corresponding to the requested supplementary system information (that is, performs an operation required when the system information is received); if the request message does not include the requested system information (that is, indicates that the requested system information will be broadcast) (for example, the response message does not include the information element rrc-SImessage), the UE receives the broadcast supplementary system information.

Optionally, the base station determines, according to the situation or the requested supplementary system information, whether to broadcast/schedule the requested supplementary system information or to include the requested supplementary system information in the system information request response message. Accordingly, the UE may determine, according to the type (or capability) thereof or the type of the requested system information or the current RRC state, to send a CCCH or DCCH request message and receive a CCCH, DCCH, or BCCH response message. For example, the system information is divided into two types, and if the UE requests the first type of system information, a response message transmitted on a CCCH is received; if the UE requests the second type of system information, a response message transmitted on a BCCH is received.

Optionally, a second timer is started if the system information request response message received by the UE does not include the system information requested by the UE. A value of the second timer is predefined or configured through RRC signaling.

Optionally, the first timer is stopped if the system information request response message received by the UE includes the system information requested by the UE.

Optionally, the first timer is stopped if the UE receives the system information request response message.

Optionally, a third timer is started if the UE receives a system information request rejection message, and the UE cannot send the system information request message again when the third timer is running; the UE can send the system information request message only when the third timer expires. A value of the third timer may be predefined or configured through RRC signaling or included in the system information request rejection message.

Optionally, if the UE receives the system information request rejection message, the following operation may be performed: reset a MAC layer and release a MAC configuration; and/or notify the upper layer of failure in acquiring the system information.

It should be noted that it may be determined according to different fields in the system information request response message whether the system information request response message is a system information request rejection message. For example, if the system information request response message includes the requested system information or includes an indication indicating that the requested system information will be broadcast/scheduled, the system information request response is not a system information request rejection message; otherwise, the system information request response is a system information request rejection message.

Receiving/Sending of Supplementary System Information

Specifically, the UE may receive the requested supplementary system information in a corresponding scheduling period according to the scheduling information of the requested supplementary system information carried in the system information request response message. An SI-RNTI may be predefined or configured through RRC for monitoring a PDCCH corresponding to the requested supplementary system information. Alternatively, the scheduling information is not included in the system information request response message, and is configured through RRC signaling (for example, included in the first system information). An operation required when the supplementary system information is received is performed according to the received supplementary system information. Optionally, the first timer or the second timer is stopped when the supplementary system information is received.

Optionally, failure in acquiring the system information is indicated to the upper layer when the first timer or the second timer expires. Optionally, whether the number of times the system information request message is sent reaches a set maximum allowable number of transmissions is first determined before failure in acquiring the system information is indicated to the upper layer. The maximum allowable number of transmissions is predefined or configured through RRC signaling (for example, included in the first system information). If the maximum allowable number of transmissions is not reached, the UE, may repeat step S50 to continue to request the required supplementary system information.

Implementation Scheme 2

Figure 4:
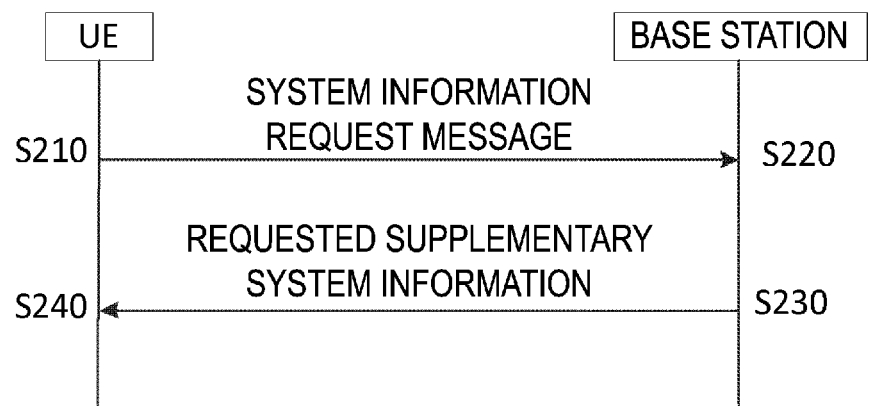
FIG. 4 is a flowchart of a method for acquiring supplementary information according to Implementation Scheme 2 of the present disclosure.

According to the present disclosure, UE may also use a random access process to receive supplementary system information. FIG. 4 is a flowchart of a method for acquiring supplementary information according to Implementation Scheme 2 of the present disclosure. An operation of a media access control layer when the UE uses a random access process to receive supplementary system information is described below with reference to FIG. 4.

Step S210: the UE sends a system information acquisition request and starts a fourth timer, a value of the fourth timer being predefined or configured through RRC signaling.

In one embodiment, if the supplementary system information can be sent only in a start subframe of a system information change period (for example, assuming that a base station receives a system information request message in an n-th system information change period, the base station will send the requested system information in a next system information change period), the fourth timer is a time window within which the UE receives the requested system information; a value of the time window may be set to a multiple of the system information change period. Preferably, a start position of the time window is a start subframe of a next change period subsequent to the sending of the request message. Alternatively, a start position of the time window is a last subframe for sending the system information request message plus an offset. A value of the offset is predefined or configured through RRC signaling.

In another embodiment, the value of the fourth timer is a time window within which the UE receives the requested system information. A value of the time window is a multiple of a sending period of first system information for scheduling the requested system information. Preferably, a start position of the time window is a start subframe of a next sending period subsequent to the sending of the request message. Alternatively, a start position of the time window is a last subframe for sending the system information request message plus an offset. A value of the offset is predefined or configured through RRC signaling.

It should be noted that the first timer may also be a time window, and a value and a start position of the time window may be the same as those of the fourth timer. Optionally, the start position of the time window may be the time when the UE sends a system information request message to a lower layer (that is, the first timer is started when the system information request message is sent to the lower layer).

Step S220: the base station receives the system information request message sent by the UE. Then, step S230: the base station sends the requested supplementary system information.

Step S240: the UE receives the requested supplementary system information within a defined time window (or when the fourth timer is running).

In one embodiment, the fourth timer is stopped if a notification from the lower layer for receiving PDCCH transmission is received and a C-RNTI MAC CE is carried in the system information request message.

in one embodiment, the fourth timer is stopped if the UE receives a PDCCH scrambled by an RNTI (denoted as SIR-RNTI) used for the system information request message. Optionally, it is necessary to further determine whether a received response message includes the system information requested by the UE or an indication indicating that the system information requested by the UE will he sent (for example, broadcast), and if so, the fourth timer is stopped.

In one embodiment, the fourth timer is stopped if the UE receives a PDCCH scrambled by a temporary C-RNTI. Optionally, it is necessary to further determine whether a received response message includes the system information requested by the UE or an indication indicating that the system information requested by the UE will be broadcast, and if so, the fourth timer is stopped.

When the fourth timer expires, if the number of preamble sequence transmissions has reached a maximum allowable number of transmissions plus 1, failure in acquiring the system information is indicated to an upper layer.

Figure 5:
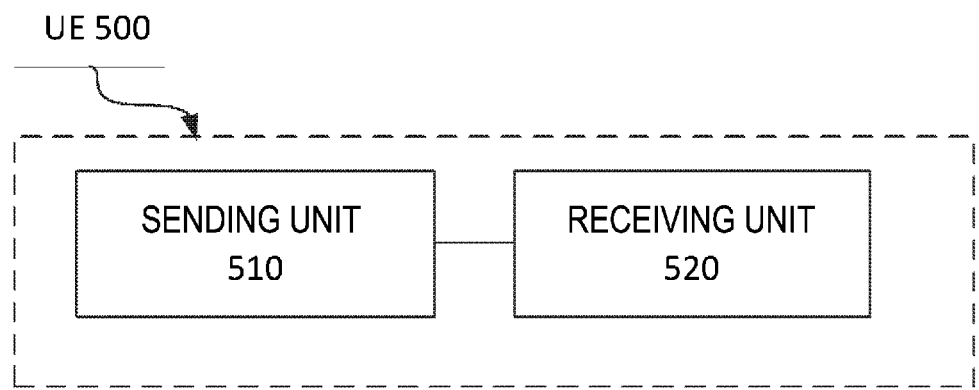
FIG. 5 is a block diagram of user equipment according to Implementation Scheme 1 of the present disclosure.

In accordance with Implementation Scheme 1 described above, the present disclosure provides user equipment (UE). FIG. 5 is a block diagram of UE 500 according to Implementation Scheme 1 of the present disclosure. As shown in the figure, the UE 500 includes: a sending unit 510, configured to send a preamble sequence to a base station to request supplementary system information; and a receiving unit 520, configured to receive a response message from the base station.

In one embodiment, the preamble sequence includes multiple preamble sequences corresponding to different system information blocks/system information block groups respectively, and the sending unit 510 is further configured to: select a preamble sequence corresponding to a system information block/system information block group required by the UE from the multiple preamble sequences for sending.

In one embodiment, the preamble sequence includes multiple preamble sequences corresponding to different system information blocks/system information block groups respectively, and one of the multiple preamble sequences corresponds to all supplementary system information, and when the UE needs all supplementary system information, the sending unit 510 is further configured to: select a preamble sequence corresponding to all supplementary system information from the multiple preamble sequences for sending.

In one embodiment, the correspondence between the multiple preamble sequences and system information blocks/system information block groups is predefined or configured through RRC signaling.

In one embodiment, the correspondence is: one preamble sequence corresponds to one system information block; or one preamble sequence corresponds to one system information block group.

In one embodiment, the preamble sequence includes multiple preamble sequences, and the sending unit 510 is further configured to: select, according to the number of required system information blocks/system information block groups, a corresponding number of preamble sequences for sending.

In one embodiment, the sending unit 510 is further configured to: send a preamble sequence on a resource configured through RRC signaling for sending the requested supplementary system information.

In one embodiment, different resources are configured for requesting different system information blocks/system information block groups, where the sending unit 510 is further configured to: send a preamble sequence on a corresponding resource according to a system information block/system information block group required by the UE.

In one embodiment, the response message indicates that the base station will broadcast the requested system information block/system information block group, and the receiving unit 520 is further configured to: receive the broadcast system information block/system information block group.

In one embodiment, the response message indicates scheduling information of the requested system information block/system information block group, and the receiving unit 520 is further configured to: receive the requested system information block/system information block group according to the scheduling information.

In one embodiment, the scheduling information is pre-configured through RRC signaling, and the response message indicates that the requested system information block/system information block group will be scheduled according to the pre-configured scheduling information, and the receiving unit 520 is further configured to: receive the requested system information block/system information block group according to the pre-configured scheduling information.

In one embodiment, the response message indicates an allocated uplink resource, where the UE is authorized to send the system information request message on the uplink resource to request the required supplementary system information from the base station.

In one embodiment, the sending unit 510 is further configured to: send the system information request message on the allocated uplink resource, the system information request message indicating the required system information block/system information block group.

In one embodiment, the system information request message includes an identifier indicating that all supplementary system information is needed.

In one embodiment, the system information request message is an RRC message transmitted on an uplink CCCH logical channel or an uplink DCCH logical channel.

In one embodiment, the system information request message includes a UE identifier.

In one embodiment, the UE identifier is an identifier received from an upper layer or a random number generated by the UE.

In one embodiment, the system information request message includes a time stamp recording a current system time.

In one embodiment, the system information request message is one or more MAC CEs.

In one embodiment, the receiving unit 520 is further configured to: receive a system information request response message in response to the sending of the system information request message.

In one embodiment, the system information request response message is an RRC message transmitted on a downlink CCCH logical channel or a downlink DCCH logical channel or a downlink BCCH logical channel.

In one embodiment, the system information request response message includes the requested system information block/system information block group.

In one embodiment, the system information request response message indicates that the base station will broadcast the requested system information block/system information block group, and the receiving unit 520 is further configured to: receive the broadcast system information block/system information block group.

In one embodiment, the system information request response message indicates scheduling information of the requested system information block/system information block group, and the receiving unit 520 is further configured to: receive the requested system information block/system information block group according to the scheduling information.

Figure 6:
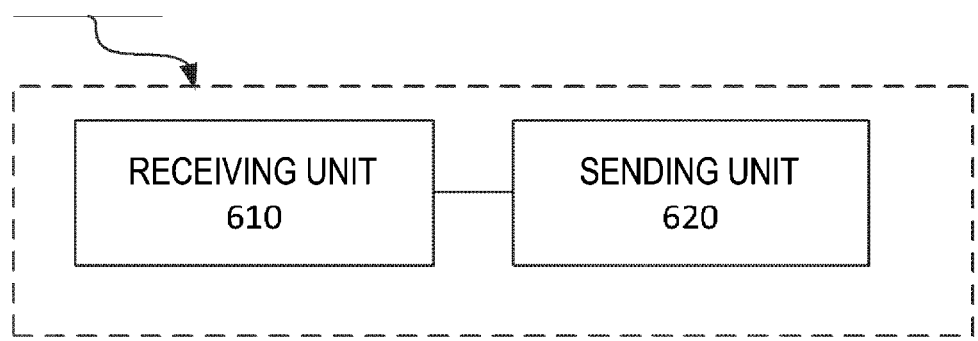
FIG. 6 is a block diagram of base station according to Implementation Scheme 1 of the present disclosure.

In accordance with Implementation Scheme 1 described above, the present disclosure provides a base station. FIG. 6 is a block diagram of a base station 60 according to Implementation Scheme 1 of the present disclosure. As shown in the figure, the base station 600 includes: a receiving unit 610, configured to receive from UE a preamble sequence for requesting supplementary system information; and a sending unit 620, configured to send a response message to the UE.

In one embodiment, the preamble sequence includes multiple preamble sequences corresponding to different system information blocks/system information block groups respectively, and the sending unit 620 is further configured to: include, in the response message, a system information block/system information block group corresponding to the received preamble sequence.

In one embodiment, the preamble sequence includes multiple preamble sequences corresponding to different system information blocks/system information block groups respectively, and the sending unit 620 is further configured to: send a response message to the UE, the response message indicating that a requested system information block/system information block group will be broadcast.

In one embodiment, the sending unit 620 is further configured to: broadcast a requested system information block/system information block group.

In one embodiment, the preamble sequence includes multiple preamble sequences corresponding to different system information blocks/system information block groups respectively, and the sending unit 620 is further configured to: send a response message to the UE, the response message indicating scheduling information of a requested system information block/system information block group; and send the requested system information block/system information block group according to the scheduling information.

In one embodiment, different resources are configured for the UE to request different system information blocks/system information block groups, and the sending unit 620 is further configured to: determine, according to a resource receiving the preamble sequence, the supplementary system information required by the UE for sending.

In one embodiment, the response message includes an uplink resource allocated to the UE, where the UE is authorized to send a system information request message on the uplink resource to request the required supplementary system information.

In one embodiment, the receiving unit 610 is further configured to: receive, on the allocated uplink resource, the system information request message sent by the UE to request the required supplementary system information.

In one embodiment, the sending unit 620 is further configured to: send a system information request response message in response to the receiving of the system information request message.

In one embodiment, the system information request response message is an RRC message transmitted on a downlink CCCH logical channel or a downlink DCCH logical channel or a downlink BCCH logical channel.

In one embodiment, the system information request response message includes a requested system information block/system information block group.

In one embodiment, the system information request response message indicates that a requested system information block/system information block group will be broadcast, and the sending unit 620 is further configured to: broadcast the system information block/system information block group.

In one embodiment, the system information request response message indicates scheduling information of a requested system information block/system information block group, and the sending unit 620 is further configured to: send the requested system information block/system information block group according to the scheduling information.

The other embodiments described above with reference to Implementation Scheme 1 are also applicable to the UE 500 and the base station 600.

Figure 7:
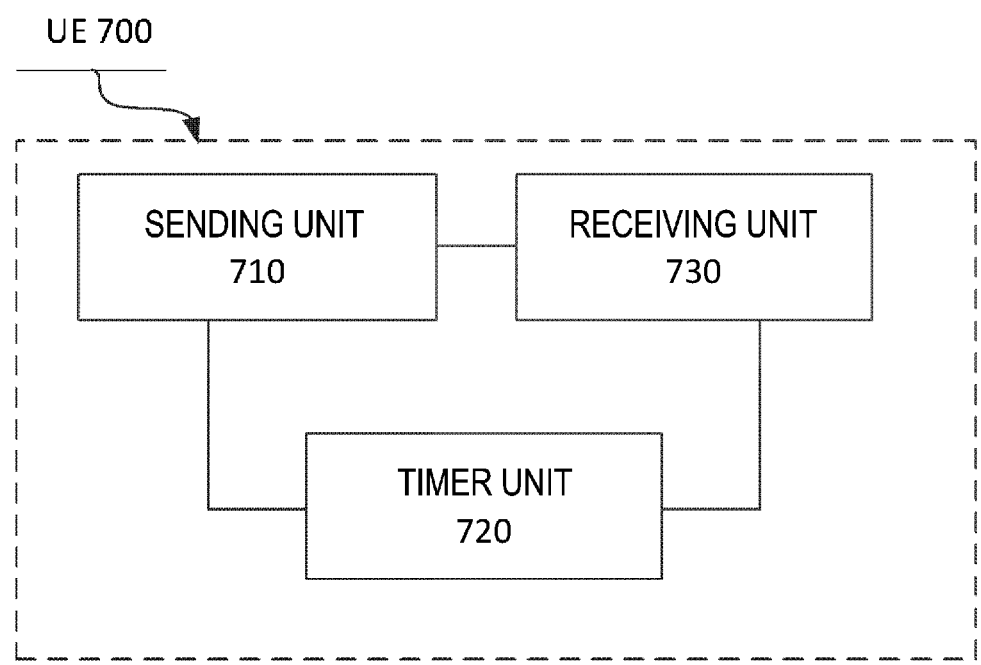
FIG. 7 is a block diagram of user equipment according to implementation Scheme 2 of the present disclosure.

In accordance with Implementation Scheme 2 described above, the present disclosure provides user equipment (UE). FIG. 7 is a block diagram of UE 700 according to implementation Scheme 2 of the present disclosure. As shown in the figure, the UE 700 includes: a sending unit 710, configured to send a system information request message to a base station to request required supplementary system information; a timer unit 720, configured to start a timer at the moment when the sending unit 710 sends the system information request message to the base station; and a receiving unit 730, configured to receive the requested supplementary system information within a time window defined by the timer.

In one embodiment, a value of the time window is set to a multiple of a system information change period.

In one embodiment, a start position of the time window is set to a start subframe of a next system information change period subsequent to the sending of the system information request message.

In one embodiment, a start position of the time window is set to a last subframe of the system information request message plus an offset, and a value of the offset is predefined or configured through RRC signaling.

In one embodiment, a value of the time window is set to a multiple of a sending period of minimum system information for scheduling the requested supplementary system information.

In one embodiment, a start position of the time window is set to a start subframe of a next sending period subsequent to the sending of the system information request message.

In one embodiment, a start position of the time window is set to a last subframe of the system information request message plus an offset, and a value of the offset is predefined or configured through RRC signaling.

Figure 8:
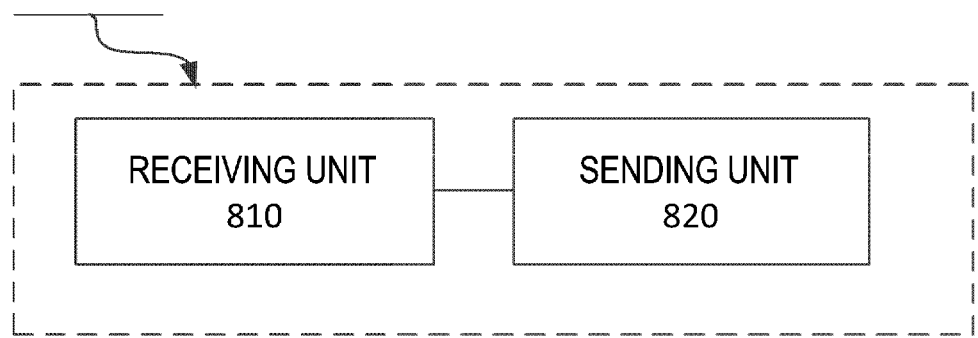
FIG. 8 is a block diagram of a base station according to implementation Scheme 2 of the present disclosure.

In accordance with Implementation Scheme 2 described above, the present disclosure provides a base station. FIG. 8 is a block diagram of a base station 800 according to Implementation Scheme 2 of the present disclosure. As shown in the figure, the base station 800 includes: a receiving unit 810, configured to receive a system information request message from UE, the system information request message requesting supplementary system information required by the UE; and a sending unit 820, configured to send the requested supplementary system information to the UE in response to the receiving of the system information request message.

The other embodiments described above with reference to Implementation Scheme 2 are also applicable to the UE 700 and the base station 800.

It should also be noted that the user equipment and base stations described in FIGS. 5 to 8 are drawings made merely for enabling those skilled in the art to clearly understand the present invention, some units/components unnecessary to understanding of the present invention are omitted in the drawings, and the protection scope of the present invention should not be limited by the specific details of the drawings. For example, more units/components, such as displays, operation and maintenance interfaces, and antennas, may be included in the actual production device. Similarly, the units in FIGS. 5 to 8 may also be implemented by more or fewer units/components.

It should be understood that the above embodiments of the present invention may be implemented through software, hardware or a combination of software and hardware. For example, various components of the base station and user equipment in the above embodiments may be implemented through multiple devices or circuits. These devices include, but are not limited to: an analog circuit device, a digital circuit device, a digital signal processing (DSP) circuit, a programmable processor, an application specific integrated circuit (ASIC), a field programmable gate array (FPGA), and a programmable logic device (CPLD), and the like.

In addition, the embodiments of the present invention disclosed herein may be implemented on a computer program product. More specifically, the computer program product is a product as follows: The product has a computer-readable medium on which computer program logic is encoded. When executed on a computing device, the computer program logic provides relevant operations to implement the above-described technical solutions of the present invention. When executed on at least one processor of a computing system, the computer program logic enables the processor to perform the operations (methods) described in the embodiments of the present invention. Such an arrangement of the present invention is typically provided as software, code, and/or other data structures that are configured or encoded on a computer-readable medium, such as an optical medium (for example, a CD-ROM), a floppy disk, or a hard disk, or other media such as firmware or microcode on one or more ROM or RAM or PROM chips, or downloadable software images, shared databases and so on in one or more modules. Software or firmware or such configuration may be installed on a computing device such that one or more processors in the computing device perform the technical solutions described in the embodiments of the present invention.

Embodiments of the present invention disclosed herein may be implemented as a program running on a device according to the present invention. The program running on the device according to the present invention may be a program that enables the computer to implement the functions of the embodiments of the present invention by controlling the central processing unit (CPU). The program or information processed by the program can be stored temporarily in a volatile memory (for example, a random access memory (RAM)), a hard disk drive (HDD), a non-volatile memory (for example, a flash memory), or other memory systems.

Although the present invention has been shown in connection with the preferred embodiments of the present invention, it will be understood by those skilled in the art that various modifications, substitutions and alterations may be made to the present invention without departing from the spirit and scope of the present invention. Accordingly, the present invention should not be defined by the above-described embodiments, but should be defined by the appended claims and their equivalents.

The invention claimed is:

1. A method performed by user equipment (UE), comprising:
   determining whether the UE requires all or only a subset of supplementary system information;
   generating a system information request message while the UE is in a connected state, wherein the system information request message includes a first information element that indicates a list of requested system information blocks (SIBs), and wherein the list of requested SIBs is selected based on a determination of whether the UE requires all or only the subset of the supplementary system information;
   sending the system information request message to a base station on an uplink dedicated control channel (DCCH);
   starting a first timer upon sending the system information request message; and
   stopping the first timer upon receiving the requested system information blocks (SIBs) sent by the base station to the UE in the connected state in response to the system information request message.

2. The method of claim 1, wherein the first information element is denoted as otherSIBRequestList.

3. The method of claim 1, wherein the system information request message includes a second information element indicating that all supplementary system information is requested.

4. The method of claim 1, further comprising:
   receiving a system information request response message from the base station that contains the requested system information blocks (SIBs), wherein the system information request response message is received from the base station on a downlink dedicated control channel (DCCH).

5. The method of claim 1, further comprising:
   receiving a system information request response message from the base station that contains the requested system information blocks (SIBs), wherein the requested system information blocks (SIBs) are included in a second information element, and wherein the second information element is denoted as rrc-SImessage.

6. The method of claim 1, wherein the system information request message includes a second information element that indicates a list of requested system information group identifiers.

7. The method of claim 6, wherein the system information block group identifier is configured through radio resource control (RRC) signaling.

8. User equipment (UE), comprising:
   a processor configured to determine whether the UE requires all or only a subset of supplementary system information;
   a transmitter configured to send to a base station a system information request message while the UE is in a connected state, wherein the system information request message includes a first information element that indicates a list of requested system information blocks (SIBs), wherein the list of requested SIBs is selected based on a determination of whether the UE requires all or only the subset of the supplementary system information, wherein the transmitter is configured to send the system information request message to the base station on an uplink dedicated control channel (DCCH), and wherein the connected state is denoted as RRC_CONNECTED; and
   a timer configured to start upon sending the system information request message to the base station and to stop upon receiving the requested system information blocks (SIBs) from the base station in response to the system information request message.

9. The UE according to claim 8, further comprising:
   a receiver configured to receive a system information request response message from the base station that contains the requested system information block (SIBs), and wherein the receiver is configured to receive the system information request response message from the base station on a downlink dedicated control channel (DCCH).

10. The UE according to claim 9, wherein the requested system information blocks (SIBs) received from the base station in the system information request response message are included in a second information element denoted as rrc-SImessage.

11. The UE according to claim 8, wherein the system information request message includes a second information element indicating that all supplementary system information is requested.

12. A method used in a base station, comprising:
receiving a system information request message from user equipment (UE) in a connected state on an uplink dedicated control channel (DCCH), wherein the system information request message includes a first information element that indicates a list of requested system information blocks (SIBs), and wherein the list of requested SIBs is selected based on a determination of whether the UE requires all or only a subset of the supplementary system information; and
sending the requested system information blocks (SIBs) to the UE in response to receiving the system information request message, wherein the requested system information blocks (SIBs) are contained in a system information request response message sent to the UE on a downlink dedicated control channel (DCCH).

13. The method of claim 12, wherein the first information element is denoted as otherSIBRequestList.

14. The method of claim 12, wherein the system information request message includes a second information element if the UE is requesting all of the supplementary system information.

15. A base station, comprising:
a receiver configured to receive a system information request message from user equipment (UE) in a connected state on an uplink dedicated control channel (DCCH), wherein the system information request message includes a first information element that indicates a list of requested system information blocks (SIBs), and wherein the list of requested SIBs is selected based on a determination of whether the UE requires all or only a subset of the supplementary system information; and
a transmitter configured to send the requested system information blocks (SIBs) to the UE in response to receiving the system information request message, wherein the transmitter is configured to send the requested system information blocks (SIBs) to the UE in a system information request response message on a downlink dedicated control channel (DCCH).

16. The base station of claim 15, wherein the first information element is denoted as otherSIBRequestList.

17. The base station of claim 15, wherein the system information request message includes a second information element if the UE is requesting all of the supplementary system information.

18. The base station of claim 17, wherein the second information element is denoted as allOtherSIRequest.

19. The method of claim 3, wherein the second information element is denoted as allOtherSIRequest.

20. The method of claim 14, wherein the second information element is denoted as allOtherSIRequest.

* * * * *